US011901600B2

(12) United States Patent
Chun

(10) Patent No.: US 11,901,600 B2
(45) Date of Patent: Feb. 13, 2024

(54) CERAMIC WAVEGUIDE FILTER INCLUDING A PLURALITY OF RESONANT CAVITIES COUPLED BY A CAPACITIVE COUPLING STRUCTURE AND A METHOD FOR MANUFACTURE

(71) Applicant: ACE TECHNOLOGIES CORPORATION, Incheon (KR)

(72) Inventor: Dong Wan Chun, Incheon (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 203 days.

(21) Appl. No.: 17/329,821

(22) Filed: May 25, 2021

(65) Prior Publication Data

US 2021/0280954 A1 Sep. 9, 2021

Related U.S. Application Data

(63) Continuation of application No. PCT/KR2019/002984, filed on Mar. 14, 2019.

(30) Foreign Application Priority Data

Nov. 26, 2018 (KR) ........................ 10-2018-0147467
Mar. 7, 2019 (KR) ........................ 10-2019-0026078

(51) Int. Cl.
*H01P 1/208* (2006.01)
*H01P 1/163* (2006.01)
(Continued)

(52) U.S. Cl.
CPC ............ *H01P 1/2088* (2013.01); *H01P 1/163* (2013.01); *H01P 1/2002* (2013.01); *H01P 3/13* (2013.01);
(Continued)

(58) Field of Classification Search
CPC ...... H01P 1/2088; H01P 7/065; H01P 1/2002; H01P 11/007
(Continued)

(56) References Cited

U.S. PATENT DOCUMENTS 6,977,566 B2 * 12/2005 Fukunaga ............ H01P 1/2088
333/208
2003/0137362 A1 7/2003 Matsui et al.
(Continued)

FOREIGN PATENT DOCUMENTS

KR 10-1555943 B1 9/2015
KR 10-2017-0108370 A 9/2017
(Continued)

OTHER PUBLICATIONS

International Search Report and Written Opinion issued from PCT International Application No. PCT/KR2019/002984 dated Aug. 22, 2019.

*Primary Examiner* — Benny T Lee

(57) ABSTRACT

A ceramic waveguide filter comprises a plurality of resonant cavities defined by a plurality of through partition walls formed in a single ceramic block to divide sections of the ceramic block according to a pre-designated pattern, a plurality of resonant recesses formed in the sections of the plurality of resonant cavities divided by the through partition walls, a metal layer formed on an inner surface of each of the plurality of through partition walls, and input/output interfaces formed in two resonant cavities inputting and outputting signals among the plurality of resonant cavities.

16 Claims, 8 Drawing Sheets

(51) Int. Cl.

| | |
|---|---|
| ***H01P 1/20*** | (2006.01) |
| ***H01P 3/13*** | (2006.01) |
| ***H01P 7/06*** | (2006.01) |
| ***H01P 7/10*** | (2006.01) |
| ***H01P 11/00*** | (2006.01) |

(52) U.S. Cl.
CPC ................ *H01P 7/06* (2013.01); *H01P 7/065* (2013.01); *H01P 7/10* (2013.01); *H01P 11/002* (2013.01); *H01P 11/006* (2013.01); *H01P 11/007* (2013.01)

(58) Field of Classification Search
USPC .......................................................... 333/208
See application file for complete search history.

(56) References Cited

U.S. PATENT DOCUMENTS

| | | | | |
|---|---|---|---|---|
| 2009/0231064 | A1* | 9/2009 | Bates et al. | H01P 1/2088 333/208 |
| 2011/0279200 | A1* | 11/2011 | Vangala | H01P 7/10 333/209 |
| 2016/0099492 | A1* | 4/2016 | Yuan et al. | H01P 1/2084 333/219.1 |

FOREIGN PATENT DOCUMENTS

| | | | |
|---|---|---|---|
| KR | 10-1803480 | B1 | 11/2017 |
| KR | 10-2018-0010192 | A | 1/2018 |

* cited by examiner

CERAMIC WAVEGUIDE FILTER INCLUDING A PLURALITY OF RESONANT CAVITIES COUPLED BY A CAPACITIVE COUPLING STRUCTURE AND A METHOD FOR MANUFACTURE

CROSS-REFERENCE TO RELATED APPLICATIONS

This application is a continuation of pending PCT International Application No. PCT/KR2019/002984, which was filed on Mar. 14, 2019, and which claims priority from Korean Patent Application No. 10-2018-0147467 filed on Nov. 26, 2018, and Korean Patent Application No. 10-2019-0026078 filed on Mar. 7, 2019. The disclosures of the above patent applications are incorporated herein by reference in their entirety.

BACKGROUND

1. Technical Field

The present disclosure relates to a ceramic waveguide filter, more particularly to a ceramic waveguide filter used in a mobile communication system.

2. Description of the Related Art

Advances in communication services require faster data transmission speeds, which require increasing system bandwidth, improving reception sensitivity, and minimizing interference from other communication system carriers.

There is a continually growing demand for filters that provide the properties of lower insertion loss with higher rejection. Coaxial resonant cavities made with metal material are often used to implement filters in mobile communication systems due to the advantages that coaxial resonator cavities provide in terms of loss, size, and cost compared with other resonant cavities such as dielectric resonant cavities.

However, due to lower output and smaller sizes of base station systems such as massive MIMO antennas, the existing coaxial resonant cavities have limitations in size and the need for implementing ultra-small filters is emerging.

Active researches on ceramic waveguide filters is being conducted to evaluate ceramic waveguide filters as a viable replacement to filters using the existing coaxial resonant cavity. The ceramic waveguide filter is a filter with cavities filled with a ceramic material having low loss and high dielectric constant which will significantly reduce the size compared to the existing coaxial resonant cavity filter while providing excellent loss characteristics.

FIG. 1 illustrates the structure of an existing ceramic waveguide filter.

Referring to FIG. 1, the existing ceramic waveguide filter comprises a multiple number of ceramic cavities 111, 112, 113 and 114, a multiple number of partition walls 121, 122 and 123 positioned between the cavities, an input interface port 140, and an output interface port 150.

In the existing ceramic waveguide filter as shown in FIG. 1, each of the cavities 111, 112, 113 and 114 are independently manufactured with individual ceramic blocks, and the partition walls 121, 122, and 123 are formed on one surface of each of the cavities. The partition walls 121, 122, and 123 may be formed through metallization of one surface of the cavity.

In each of the partition walls, slots 131, 132, and 133 are formed for coupling between cavities. The signal from the first cavity 111 can be coupled to the second cavity 112 through the first slot 131 formed in the first partition wall 121.

Such an existing ceramic waveguide filter requires a process of independently manufacturing each of the ceramic cavities 111, 112, 113 and 114, forming a partition wall, and then joining the respective cavities. Here, the cavities are generally joined by soldering or the like.

Although the existing ceramic waveguide filter as shown in FIG. 1 is compact and exhibits excellent performance with low loss, such a ceramic waveguide filter uses a rectangular waveguide cavity resonant mode which means a higher order spurious mode exists close to the passband of the filter. In addition, in order to suppress higher order spurious mode, a low pass filter must be additionally applied, which increases the loss.

SUMMARY OF THE INVENTION

The present disclosure proposes a ceramic waveguide filter that can be manufactured in a small size.

In addition, the present disclosure proposes a ceramic waveguide filter capable of improving spurious characteristics.

In addition, the present disclosure proposes a ceramic waveguide filter that is less affected by mechanical tolerances during manufacturing.

A ceramic waveguide filter according to an embodiment of the disclosure, conceived to achieve the objectives above, includes: a plurality of resonant cavities defined by a plurality of through partition walls formed to divide sections of a ceramic block according to a pre-designated pattern in a single ceramic block; a plurality of resonant recesses formed in the sections of the plurality of resonant cavities divided by the through partition walls; a metal layer formed on inside of each of the plurality of through partition walls; and input/output interfaces formed in two of the plurality of resonant cavities for inputting and outputting signals among the plurality of resonant cavities.

The plurality of resonant recesses may be formed in each of the centers of corresponding resonant cavity regions among the plurality of resonant cavities on an upper surface or on the opposite surface of the ceramic block.

The input/output interfaces may be formed as through holes passing through the ceramic block.

The plurality of through partition walls may be formed in a pattern, which passes through the ceramic block and divides sections of the ceramic block such that the plurality of resonant cavities are set corresponding to the resonant recesses with a pre-designated frequency band. The plurality of resonant cavities are spaced apart from each other to filter the frequency band while being sequentially coupled with adjacent resonant cavities through coupling windows between the plurality of through partition walls in response to a signal input through the input/output interfaces. A resonant cavity among the plurality of resonant cavities is disposed adjacent to another resonant cavity of the plurality of resonant cavities, thereby allowing cross coupling to occur.

The ceramic waveguide filter may further include: a coupling recess spaced apart from a through partition wall on one surface of the ceramic block between resonant cavities in which the cross coupling occurs on one surface of the ceramic block and the metal layer may be further formed inside of the coupling recess.

The ceramic waveguide filter may further include: a coupling hole spaced apart from a through partition wall between the resonant cavities in which the cross coupling occurs, the coupling hole passing through the ceramic block, and the metal layer may be further formed on inside of the coupling hole.

The metal layer may be formed in an area other than a pre-designated slot area inside of the coupling hole.

The inside of the coupling hole may be formed in a stair-type structure. The metal layer may be formed in an area other than a pre-designated slot area facing one surface of the ceramic block inside of the coupling hole of a stair-type structure.

The ceramic waveguide filter may further include: a conductive sticker attached to a region in which the coupling hole is formed on one surface of the ceramic block.

The thickness of the metal layer may be adjusted depending on a pre-designated frequency band.

A method of manufacturing a ceramic waveguide filter according to another embodiment of the disclosure, conceived to achieve the objectives above, includes: in order to define a plurality of resonant cavities in a single ceramic block, forming a plurality of through partition walls dividing sections of the ceramic block according to a pre-designated pattern; forming a plurality of resonant recesses in the sections of the plurality of resonant cavities divided by the through partition walls; forming a metal layer on each of the plurality of through partition walls; and forming input/output interfaces for inputting and outputting signals in two resonant cavities among the plurality of resonant cavities.

According to an embodiment of the present disclosure, the ceramic waveguide filter can be manufactured in a small size by increasing the capacitance component of the resonant cavity. In addition, spurious characteristics can be improved and stable characteristics can be exhibited even with mechanical tolerances during manufacturing.

DETAILED DESCRIPTION OF THE INVENTION

Figure 1:
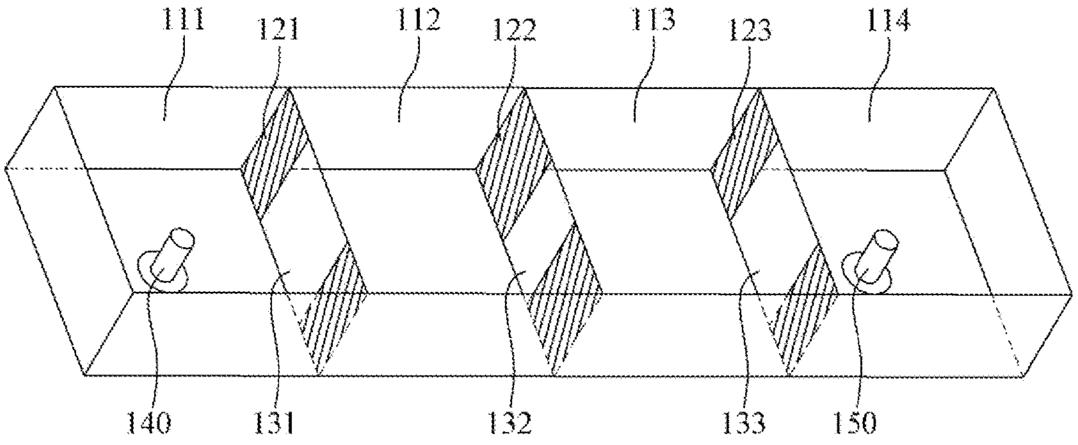
FIG. 1(PRIOR ART)
FIG. 1 illustrates the structure of an existing ceramic waveguide filter.

The present disclosure is described in detail below with reference to the accompanying drawings. However, the disclosure can be implemented in various different forms and thus is not limited to the embodiments described herein.

For a clearer understanding of the invention, parts that are not of great relevance to the invention have been omitted from the drawings, and like reference numerals in the drawings are used to represent like elements throughout the specification and description of drawings.

Throughout the specification and description of drawings, when it is described that a part is "connected" with another part, the part may be "directly connected" with the other part or "indirectly connected" with the other part possibly through a third part.

In addition, reference to a part "including" or "comprising" an element does not preclude the existence of one or more other elements and can mean other elements are further included, unless there is specific mention to the contrary.

Embodiments of the present disclosure is described in detail below with reference to the accompanying drawings.

Figure 2:
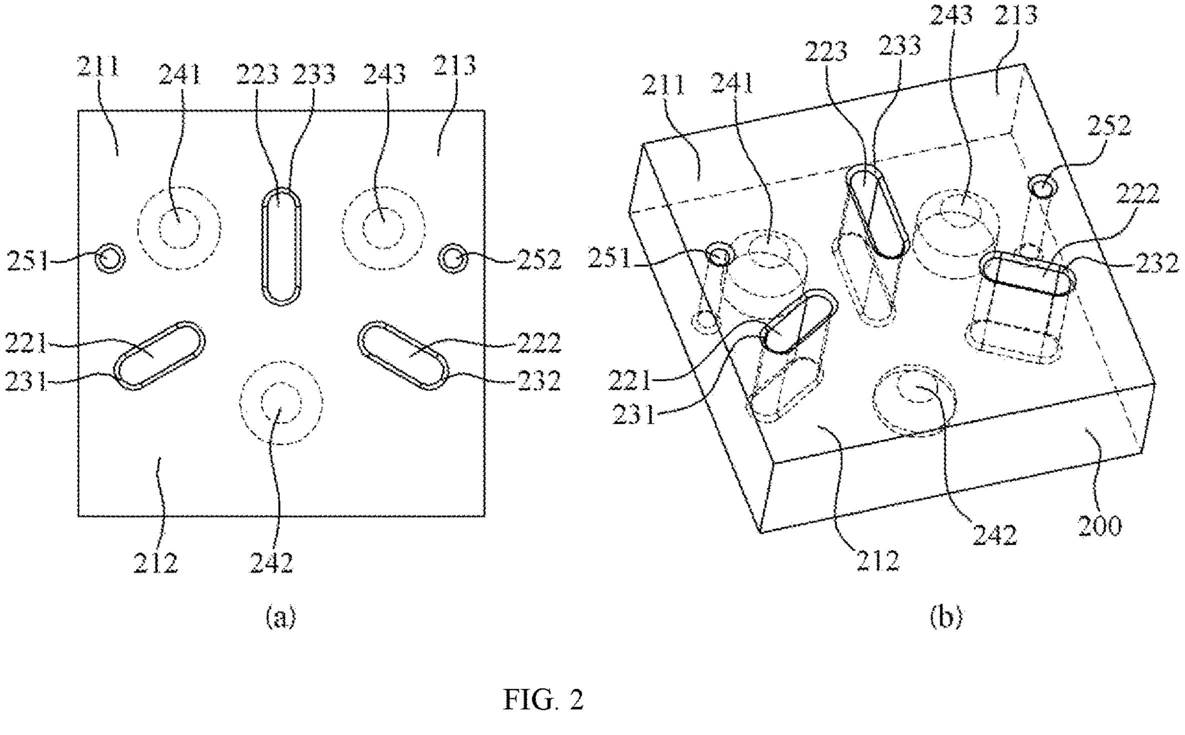
FIG. 2 illustrates the structure of a ceramic waveguide filter according to an embodiment of the present disclosure, in which (a) shows a top view and (b) shows a perspective view.

FIG. 2 illustrates the structure of a ceramic waveguide filter according to an embodiment of the present disclosure, in which (a) shows a top view and (b) shows a perspective view.

Referring to FIG. 2, the ceramic waveguide filter according to this embodiment is implemented in one piece comprising a plurality of resonant cavities 211, 212 and 213 defined by a plurality of through partition walls 221, 222 and 223 penetrating between one side and the other side of a single ceramic block 200 as shown in (b).

The plurality of through partition walls 221, 222 and 223 are formed to penetrate the ceramic block 200 according to a pre-designated pattern to divide sections of the ceramic block 200, thereby defining the plurality of resonant cavities 211, 212 and 213. In FIG. 2, as an example, the plurality of through partition walls 221, 222 and 223 are shown to be formed in a pattern extending in a straight line in the lateral direction in the ceramic block 200, but this embodiment is not limited thereto. In this embodiment, the plurality of through partition walls 221, 222 and 223 may be formed in various shapes that can easily divide sections of the ceramic block 200, and in some cases, may also be formed in the form of a branch pattern such as a T-shape or a Y-shape.

In this embodiment, the plurality of through partition walls 221, 222 and 223 are formed to be spaced apart from each other. Here, at least one of the plurality of through partition walls 221, 222 and 223 may be formed up to a side boundary of the ceramic block 200. Since the plurality of through partition walls 221, 222 and 223 are formed to be spaced apart from each other, even if all of the through partition walls 221, 222 and 223 are formed to extend up to a side boundary of the ceramic block 200, the ceramic block 200 is not cut and can maintain the shape of a single structure.

In addition, metal layers 231, 232 and 233 are formed on the inner surfaces of the plurality of through partition walls 221, 222 and 223. The metal layers 231, 232 and 233 may be formed by applying a metallization process such as plating, deposition, sputtering, etc. Typically, in RF equipment such as filters and waveguides, silver (Ag) having excellent electrical conductivity is used among conductive materials to minimize loss, but conductive materials other than silver may be used to improve properties such as corrosion resistance.

In this embodiment, the plurality of resonant cavities 211, 212 and 213 separated by the plurality of through partition walls 221, 222 and 223 may correspond to the plurality of ceramic cavities 111, 112, 113 and 114 in the existing ceramic waveguide filter shown in FIG. 1.

Since the plurality of resonant cavities 211, 212 and 213 are defined by being separated by the plurality of through partition walls 221, 222 and 223, the plurality of through partition walls 221, 222 and 223 function as cavity walls, and the space between the plurality of through partition walls 221, 222 and 223 can be viewed as a coupling window forming a coupling surface between the plurality of resonant cavities 211, 212 and 213.

As the plurality of through partition walls 221, 222 and 223 are formed to be spaced apart from each other, the resonant cavities adjacent to each other among the plurality of resonant cavities 211, 212 and 213 can be coupled through a region of the ceramic block 200 in which the through partition walls 221, 222 and 223 are not formed.

Meanwhile, as shown in FIG. 2, in the ceramic waveguide filter according to this embodiment, resonant recesses 241, 242 and 243 are formed in sections divided by a plurality of through partition walls 221, 222 and 223 on one surface or the other surface of the ceramic block 200, that is, in each region of the plurality of resonant cavities 211, 212 and 213. Here, the shape of the resonant recesses 241, 242 and 243 is not limited to the specific shape shown in FIG. 2. Although not explicitly shown, a metal layer is formed on the inner surface of each of the plurality of resonant recesses 241, 242 and 243 similarly to the plurality of through partition walls 221, 222 and 223.

The resonant recesses 241, 242 and 243 are formed in the center where an electric field (E-field) is concentrated in each area of the plurality of resonance cavities 211, 212 and 213, thereby increasing the capacitive component of each of the plurality of resonant cavities 211, 212 and 213. The increase in the capacitive component causes an effect of lowering the resonant frequency of the plurality of resonant cavities 211, 212 and 213.

In addition, if the size of the plurality of resonant cavities 211, 212 and 213 is reduced, the plurality of resonant cavities 211, 212 and 213 can maintain the same resonant frequency as before the resonant recesses 241, 242 and 243 are formed as shown in FIG. 2. When the resonant frequency is designated in advance and the resonant recesses 241, 242 and 243 are formed in the plurality of resonant cavities 211, 212 and 213, the size of the plurality of resonant cavities 211, 212 and 213 should be reduced. Therefore, compared to the case where the resonant recesses 241, 242 and 243 are not formed, the size of the ceramic waveguide filter can be reduced.

Accordingly, the pattern of the plurality of through partition walls 221, 222 and 223 can be adjusted such that a coupling is easily made between the plurality of resonant cavities 211, 212 and 213. The size of the resonant cavities is determined in which the plurality of resonant cavities 211, 212 and 213 (in which the resonant recesses 241, 242 and 243 are formed)resonate in a designated frequency band. In FIG. 2, as an example, a pattern of the plurality of through partition walls 221, 222 and 223 is illustrated in a case in which the plurality of resonant cavities 211, 212 and 213 are formed to resonate in TE101 mode.

Meanwhile, higher order spurious mode is generated in TE201 mode, TE301 mode or the like. For example, the electric field in the TE201 mode is most strongly distributed at the positions of ¼ and ⅓ when the resonant cavity is divided into quarters in the first direction. Therefore, even if the resonant recesses 241, 242 and 243 are formed in the centers of the regions of the plurality of resonant cavities 211, 212 and 213, the resonant frequency of the TE201 mode hardly changes.

However, if the size of the resonant cavities 211, 212 and 213 is reduced, the resonant frequency of the TE201 mode is increased. That is, the resonant frequency of the plurality of resonant cavities 211, 212 and 213 maintains a pre-designated resonant frequency, while the frequency of higher order spurious mode is increased and thus becomes distant from the resonant frequency of the resonant cavities 211, 212 and 213.

The frequency difference between the resonant frequency and the frequency of higher order spurious mode is used as a measure for determining spurious characteristics of the filter and is referred to as a spurious free window. In addition, as the size of the spurious free window increases, the spurious characteristics are improved.

As described above, in order to suppress higher order spurious mode, a low pass filter is additionally applied to the ceramic waveguide filter which increases the loss. The passband loss of the low pass filter depends on a cut-off frequency representing a stopband. As the cut-off frequency moves away from the passband of the ceramic waveguide filter (the resonant frequency band) the loss decreases.

Accordingly, as shown in FIG. 2, in the ceramic waveguide filter including a plurality of resonant cavities 211, 212 and 213, which is miniaturized by forming the resonant recesses 241, 242 and 243, the frequency of higher order spurious mode can be spaced farther from the passband than when the resonant recesses 241, 242 and 243 are not formed. This can minimize the incurred loss even if a low pass filter is additionally applied which means the spurious characteristics are improved.

In this embodiment, input/output interfaces 251 and 252 are formed in the two resonant cavities 211 and 213 of the beginning and the end according to a designated coupling order among the plurality of resonant cavities 211, 212 and 213 of the ceramic waveguide filter. In addition, input/output interface ports for inputting and outputting signals through the ceramic waveguide filter may be inserted into the formed input/output interfaces 251 and 252.

If the input/output interfaces 251 and 252 are implemented such that the input/output interface ports do not pass through the resonant cavities 211 and 213, but are inserted from one side or the other side of the ceramic block 200 to a pre-designated depth, like the ceramic waveguide filter shown in FIG. 1, a signal is inputted/outputted by a capacitive coupling. The capacitive coupling has a dominant electric field between the input/output interface ports and the resonant cavities 211 and 213.

At this time, if resonant recesses 241, 242 and 243 are formed in the plurality of resonant cavities 211, 212 and 213, the electric field is concentrated in a region corresponding to a location where the resonant recesses 241, 242 and 243 are formed in the resonant cavities 211, 212 and 213. Therefore, if resonant recesses 241, 242 and 243 are formed in the resonant cavities 211, 212 and 213, the strength of the electric field coupled between the input/output interface ports and the resonant cavities 211 and 213 is too weak for the ceramic waveguide filter to exhibit any broadband characteristics.

In contrast, as shown in FIG. 2, if the input/output interfaces 251 and 252 are formed as through holes penetrating between one surface and the other surface of the ceramic block 200, a signal is inputted/outputted by a strong coupling made by a magnetic field (H-field), rather than an electric field, so that the ceramic waveguide filter can exhibit broadband characteristics.

In addition, if the input/output interfaces 251 and 252 are formed as through holes, there is an advantage of the ceramic waveguide filter being insensitive to mechanical tolerances as compared to the existing ceramic waveguide filter of FIG. 1 in which the input/output interface ports is inserted from one surface or the other surface of the ceramic block 200 only to a pre-designated depth.

In FIG. 2, as an example, the input/output interfaces 251 and 252 are shown to be formed in the first resonant cavity 211 and the third resonant cavity 213. Here, it is assumed that the input interface port passes through the input/output interface 251 formed in the first resonant cavity 211. In this case, the first resonant cavity 211 receives a signal from the input interface passing through the input/output interface 251, and a coupling is made between the first resonant cavity 211 and the second resonant cavity 212 adjacent through a coupling window that is a space formed by the first through partition wall 221. In addition, a coupling is made between the second resonant cavity 212 and the third resonant cavity 213 adjacent through a coupling window that is a space formed by the second through partition wall 222. The third resonant cavity 213 outputs a signal to an output interface port passing through the input/output interface 252.

At this time, each of the plurality of resonant cavities 211, 212 and 213 can resonate in a designated frequency band according to the resonant recesses 241, 242 and 243 defined by the plurality of through partition walls 221, 222 and 223. Accordingly, in the ceramic waveguide filter according to this embodiment, the plurality of resonant cavities 211, 212 and 213 defined by the plurality of through partition walls 221, 222 and 223 can filter signals transmitted through the input interface port in multiple stages and output it to the output interface port. That is, in the ceramic waveguide filter according to this embodiment, similar to the existing ceramic waveguide filter of FIG. 1, the first to third resonant cavities 211, 212 and 213 can sequentially filter signals input from the input interface and output to the output interface.

On the one hand, if the plurality of resonant cavities 211, 212 and 213 are sequentially coupled as in the ceramic waveguide filter of FIG. 1, the plurality of through partition walls 221, 222 and 223 may be formed in a pattern extending parallel to each other laterally in the ceramic block 200. However, it is difficult to implement cross coupling between the plurality of resonant cavities 211, 212 and 213.

On the other hand, in the ceramic waveguide filter according to this embodiment shown in FIG. 2, a plurality of through partition walls 221, 222 and 223 are formed in a pattern extending in different directions from the center of the ceramic block 200 to the side. This results in the orientation where the first resonant cavity 211 is adjacent to the second resonant cavity 212 and to the third resonant cavity 213 as well. This will facilitate the cross-coupling in the ceramic waveguide filter according to this embodiment.

As described above, if the order of the first resonant cavity 211, the second resonant cavity 212, and the third resonant cavity 213 is a coupling path, a coupling is made between the first resonant cavity 211 and the second resonant cavity 212 according to the designated order. Moreover, a cross coupling may be formed between the first resonant cavity 211 and the third resonant cavity 213. That is, as the plurality of through partition walls 221, 222 and 223 are formed such that the first resonant cavity 211 is adjacent not only to the second resonant cavity 212 but also to the third resonant cavity 213, the cross coupling can be easily made between the first resonant cavity 211 and the third resonant cavity 213. At this time, an inductive cross coupling can be made between the plurality of resonant cavities 211, 212 and 213 in which a magnetic field (H-field) dominantly acts.

The cross coupling between the first resonant cavity 211 and the third resonant cavity 213 generates a transmission-zero, thereby improving attenuation characteristics of the ceramic waveguide filter. That is, the ceramic waveguide filter according to this embodiment can easily generate a transmission-zero by implementing cross coupling without additional work according to the formation pattern of the plurality of through partition walls 221, 222 and 223.

Inductive cross coupling between the first resonant cavity 211 and the third resonant cavity 213 enables the ceramic waveguide filter to generate a transmission zero at a higher frequency than the passband.

In some cases, in order to suppress cross coupling between the first resonant cavity 211 and the third resonant cavity 213, the third through partition wall 223 may be formed to extend up to the side surface of the ceramic block 200.

Meanwhile, ceramic waveguide filters made of ceramic material are sensitive to mechanical tolerances. Therefore, tuning is essential for the ceramic waveguide filter to perform accurate filtering.

In the ceramic waveguide filter according to this embodiment, tuning may be performed by adjusting the thickness of at least one of a metal layer formed on the surfaces of the plurality of through partition walls 221, 222 and 223 and a metal layer formed on the inside of the plurality of resonant recesses 241, 242 and 243 by means of grinding or the like. That is, it is possible to easily perform a tuning operation to adjust the characteristics of the ceramic waveguide filter.

In addition, in FIG. 2, as an example, the ceramic block 200 is shown to be implemented as a rectangular parallelepiped but is not limited thereto. The ceramic block 200 may be implemented in various shapes to improve the performance of the ceramic waveguide filter. In addition, the size of the ceramic block 200 may also vary in various ways depending on the frequency band of the signal to be filtered.

In addition, although not shown, in the ceramic waveguide filter according to this embodiment, at least one coupling recess (not shown) may be further formed at a position corresponding to the through partition wall 223 between the resonant cavities (here, for example, the first and the third resonant cavities 211 and 213) arranged adjacent to each other differently from the designated order among the plurality of resonant cavities 211, 212 and 213 on one side or the other side of the ceramic block 200.

If a coupling recess is formed in the cross coupling path between the first resonant cavity 211 and the third resonant cavity 213 different from the designated coupling order, capacitive cross coupling is formed between the first resonant cavity 211 and the third resonant cavity 213 in which an electric field (E-field) dominates.

Contrary to the inductive cross coupling which generates a transmission zero at a frequency higher than the passband, the capacitive cross coupling may generate a transmission zero at a frequency lower than the passband.

That is, in the ceramic waveguide filter according to this embodiment, the frequency at which the transmission zero is generated can be adjusted depending on whether a coupling recess is additionally formed between the two resonant cavities in which cross coupling occurs.

In addition, the coupling recess cannot be formed to overlap with the through partition walls 221, 222 and 223. Therefore, if the coupling recess is formed, the length of the through partition walls 221, 222 and 223 at corresponding positions may be adjusted to avoid overlap with the position of the coupling recess. In addition, if the coupling recess is formed, a metal layer may be additionally formed inside of the coupling recess as well similar to the resonant recesses 241, 242 and 243.

In some cases, the metal layer may be formed to surround up to the outer surface of the ceramic block 200.

FIG. 2 shows, as a simple example for convenience of explanation, a ceramic waveguide filter in which three resonant cavities 211, 212 and 213 are formed by three through partition walls 221, 222 and 223 on a ceramic block 200, however, the present disclosure is not limited thereto.

Figure 3:
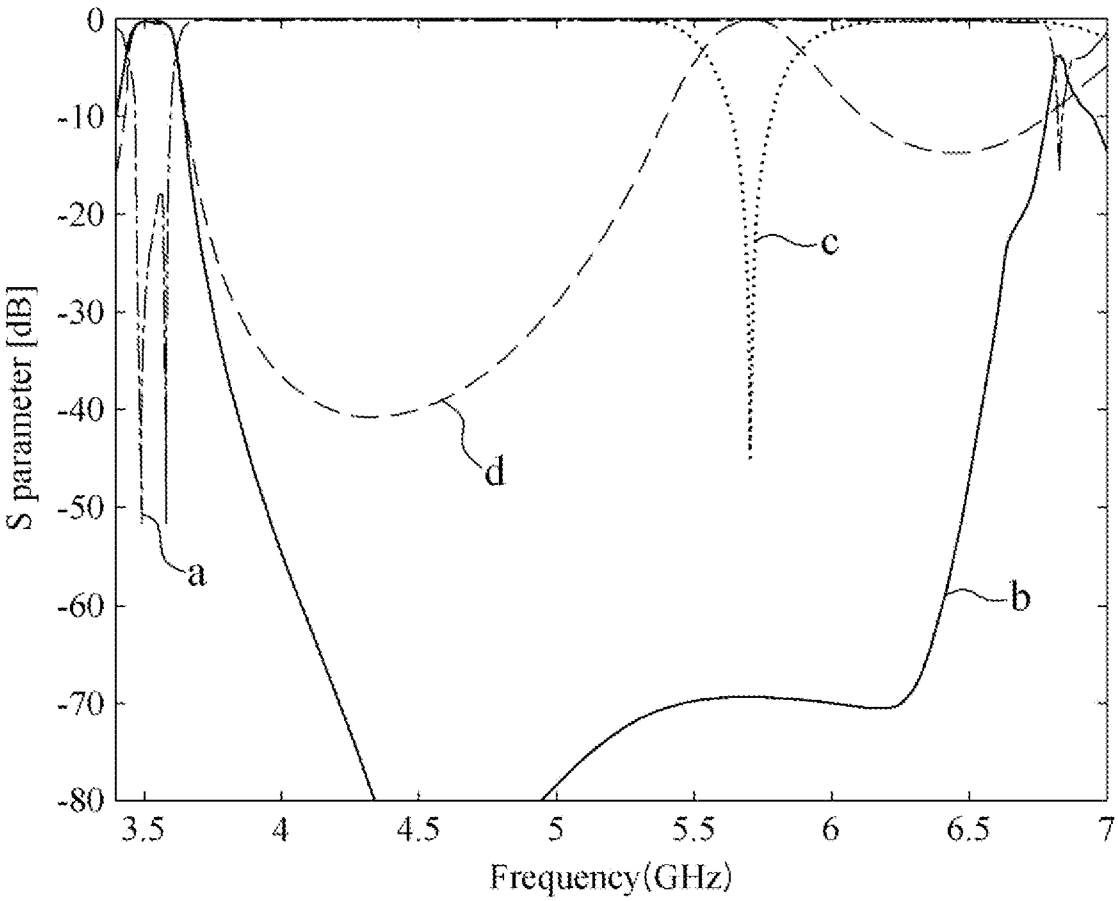
FIG. 3 shows a result of simulating the filter characteristics of the ceramic waveguide filter of FIG. 2.

FIG. 3 shows a result of simulating the loss characteristics of the ceramic waveguide filter of FIG. 2.

FIG. 3 shows a comparison of simulation results (i.e. S parameter in dB) of a ceramic waveguide filter over a frequency range in GHz having a center frequency of 3.6 GHz and a bandwidth of 100 MHz. In FIG. 3, a and b represent return loss and insertion loss of the ceramic waveguide filter in which the resonant recesses 241 to 243 are formed according to this embodiment, respectively The lines c and d represent return loss and insertion loss of the existing ceramic waveguide filter of FIG. 1, respectively.

Referring to FIG. 3, it can be seen that, in the ceramic waveguide filter in which the resonant recesses 241 to 243 are formed according to this embodiment, the spurious free window is increased by more than 1.6 GHz, compared to the existing ceramic waveguide filter as shown in FIG. 1 clearly depicting that the spurious characteristics have been improved.

In addition, although not shown, it was found that the ceramic waveguide filter according to this embodiment, in which the resonant recesses 241, 242 and 243 are formed, can be downsized by 26% or more compared to the case where the resonant recesses 241, 242 and 243 are not formed as shown in FIG. 2.

Figure 4:
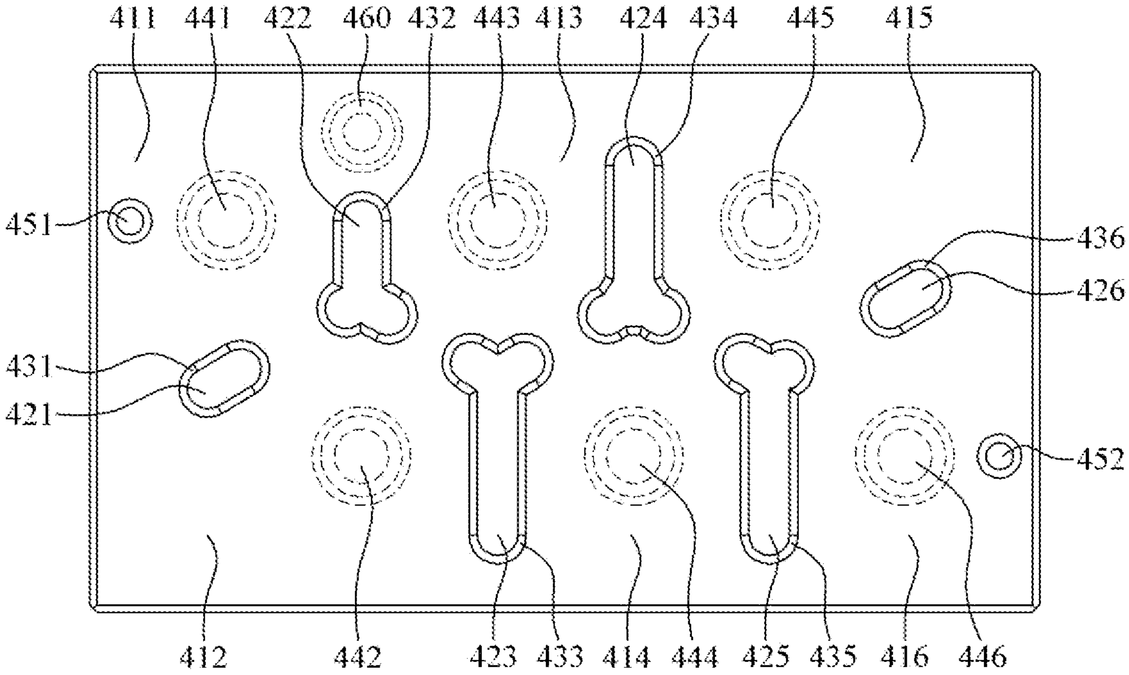
FIG. 4 and FIG. 5 respectively show a top view and a perspective view of a ceramic waveguide filter according to another embodiment of the present disclosure.
Figure 5:
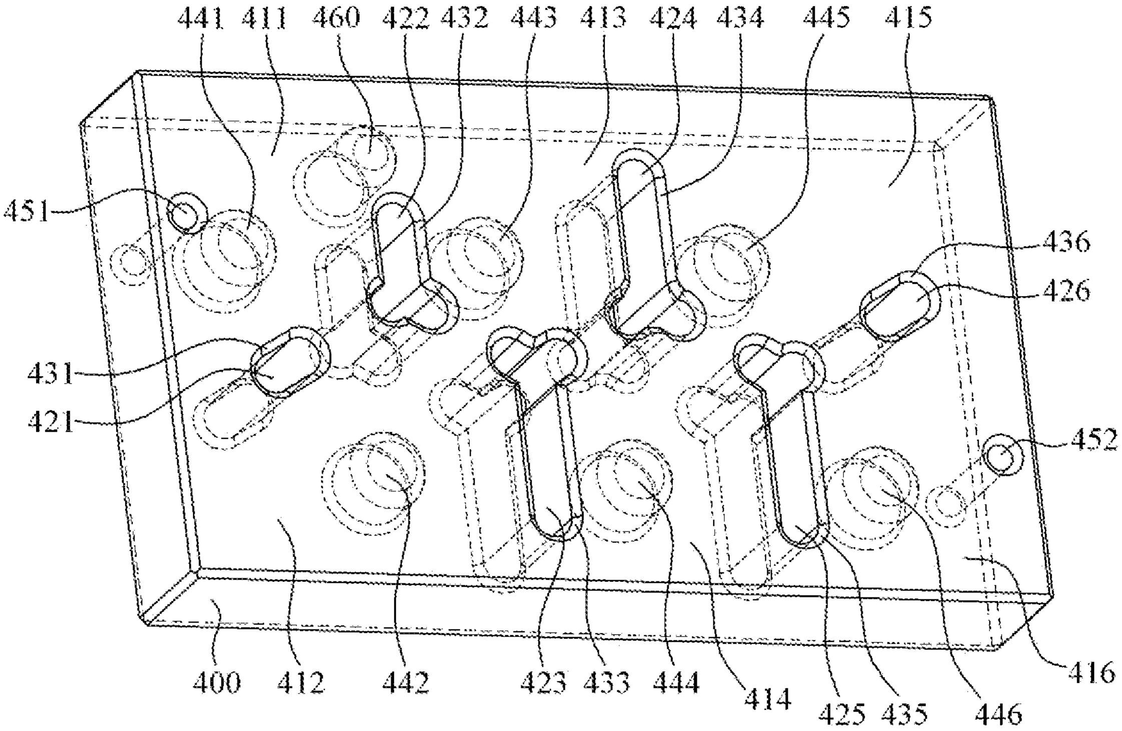

FIG. 4 and FIG. 5 respectively show a top view and a perspective view of a ceramic waveguide filter according to another embodiment of the present disclosure.

In the ceramic waveguide filter according to the present disclosure, a plurality of resonant cavities may be defined by a plurality of through partition walls formed to penetrate the ceramic block 400 (FIG. 5) according to a pre-designated pattern. Accordingly, in FIG. 4 and FIG. 5, six through partition walls 421, 422, 423, 424, 425 and 426 are formed penetrating between one surface and the other surface of the ceramic block 400 according to a pre-designated pattern, to divide the ceramic block 400 into six sections, thereby defining six resonant cavities 411, 412, 413, 414, 415 and 416.

The six through partition walls 421, 422, 423, 424, 425 and 426 are formed in a pattern for dividing the ceramic block 400 into six sections and the shape of the six through partition walls 421, 422, 423, 424, 425 and 426 may be formed differently. In addition, as shown in FIG. 4 and FIG. 5, the six through partition walls 421, 422, 423, 424, 425 and 426 may be formed in different patterns and some may be formed in the form of a branch pattern such as a T-shape or a Y-shape.

In addition, resonant recesses 441, 442, 443, 444, 445 and 446 are formed at the center of each region of the plurality of resonant cavities 411, 412, 413, 414, 415 and 416 on one surface or the other surface of the ceramic block 400. As the resonant recesses 441, 442, 443, 444, 445 and 446 are formed in the plurality of resonant cavities 411, 412, 413, 414, 415 and 416, the ceramic waveguide filter can be miniaturized compared to the case where the resonant recesses 441, 442, 443, 444, 445 and 446 are not formed, and thus the spurious characteristics can be improved.

Meanwhile, metal layers 431, 432, 433, 434, 435 and 436 are formed on the inner surfaces of each of the six through partition walls 421, 422, 423, 424, 425 and 426, and metal layers (not shown) are also formed on the inner surfaces of the resonant recesses 441, 442, 443, 444, 445 and 446.

In addition, among six resonant cavities 411, 412, 413, 414, 415 and 416, in the first and the sixth resonant cavities 411 and 416 located at both ends in the coupling order, input/output interfaces 451 and 452 are formed into which input/output interface ports are inserted. The first resonant cavity 411 receives a signal from the input interface port inserted into the input/output interface 451. The couplings are sequentially made in the second to the sixth resonant cavities 412, 413, 414, 415 and 416 and the sixth resonant cavity 416 outputs the signal to the output interface port inserted into the input/output interface 452.

The first to the sixth resonant cavities 411, 412, 413, 414, 415 and 416 may be sequentially coupled through a coupling window between the six through partition walls 421, 422, 423, 424, 425 and 426 formed to be spaced apart. That is, a coupling may be made between the first resonant cavity 411 and the second resonant cavity 412 through a coupling window corresponding to the first and the second through partition walls 421 and 422. A coupling may be made between the second resonant cavity 412 and the third resonant cavity 413 through a coupling window corresponding to the second and the third through partition walls 422 and 423. Similarly, a coupling may be made between the third resonant cavity 413 and the fourth resonant cavity 414 through a coupling window corresponding to the third and the fourth through partition walls 423 and 424. In addition, a coupling may be made between the fourth resonant cavity 414 and the fifth resonant cavity 415 through a coupling window corresponding to the fourth and the fifth through partition walls 424 and 425. Finally, a coupling may be made between the fifth resonant cavity 415 and the sixth resonance cavity 416 through a coupling window corresponding to the fifth and the sixth through partition walls 425 and 426.

At this time, the first to the sixth resonant cavities 411, 412, 413, 414, 415 and 416 resonate in a designated frequency band, thereby filtering a signal of the designated frequency band. Accordingly, the ceramic waveguide filter shown in FIG. 4 and FIG. 5 functions as a multi-stage filter that performs six-stage filtering.

Meanwhile, in the ceramic waveguide filter shown in FIG. 4 and FIG. 5, a cross coupling between the first resonant cavity 411 and the third resonant cavity 413 can be easily achieved through a coupling window corresponding to the second through partition wall 422. Moreover, a cross coupling can be made between the second resonant cavity 412 and the fourth resonant cavity 414, a cross coupling can also be made between the third resonant cavity 413 and the fifth resonant cavity 415, and a cross coupling can also be made between the fourth resonant cavity 414 and the sixth resonant cavity 416. That is, in the ceramic waveguide filter shown in FIG. 4 and FIG. 5, cross couplings may occur between a plurality of resonant cavities.

However, at least one of the six through partition walls 421, 422, 423, 424, 425 and 426 may be formed to extend to a side boundary of the ceramic block 400 such that the cross coupling between the resonant cavities is suppressed. As an example, in the ceramic waveguide filter of FIG. 4 and FIG. 5, to suppress cross couplings between the second resonant cavity 412 and the fourth resonant cavity 414, and between the fourth resonant cavity 414 and the sixth resonance cavity 416, each of the third through partition wall 423 and the fifth through partition wall 425 may be formed to extend to a side boundary of the ceramic block 400.

In addition, in FIG. 4 and FIG. 5, it is possible to further form a capacitive coupling structure 460 together with the second through partition wall 422 between the first and the third resonant cavities 411 and 413 such that a capacitive cross coupling is made between the first and the third resonant cavities 411 and 413. In this case, the pattern of the second through partition wall 422 may be adjusted so as not to overlap with the region in which the capacitive coupling structure 460 is formed. Also, a metal layer may be formed on the inside of the capacitive coupling structure 460.

As a result, referring to FIG. 4 and FIG. 5, in the ceramic waveguide filter according to this embodiment, a plurality of resonant cavities 411, 412, 413, 414, 415 and 416 can be easily implemented by forming a plurality of through partition walls 421, 422, 423, 424, 425 and 426 in a single ceramic block, the ceramic waveguide filter can be miniaturized by forming resonant recesses 441, 442, 443, 444, 445 and 446 in each of the plurality of resonant cavities 411, 412, 413, 414, 415 and 416 and the spurious characteristics can be improved as well.

In addition, by forming the input/output interfaces 451 and 452 as through holes, the ceramic waveguide filter can have a broadband characteristic, and can be made robust to mechanical tolerances.

FIG. 6 to FIG. 9 show various examples of capacitive coupling structures.

Figure 6:
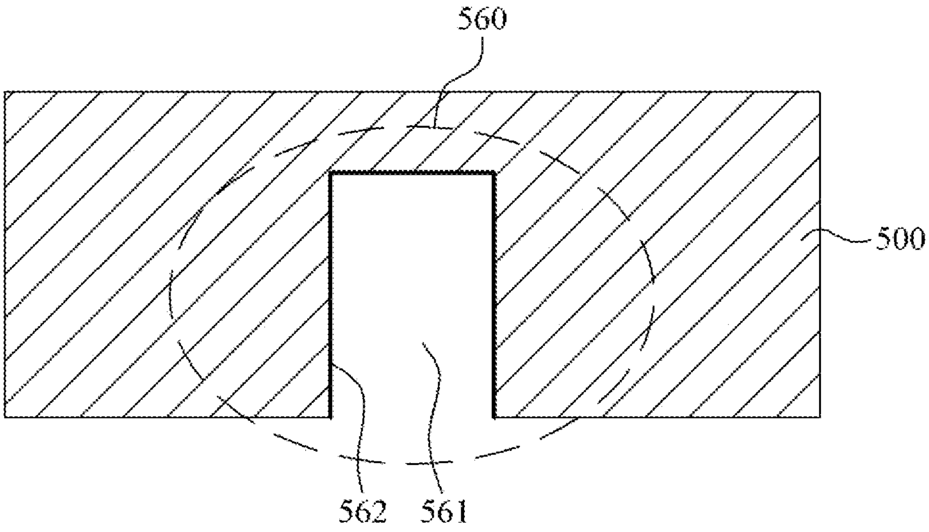
FIG. 6 to FIG. 9 show various examples of capacitive coupling structures.

FIG. 6 shows a case where a coupling recess 561 is formed as a capacitive coupling structure 560 from one surface of the ceramic block 500 toward the direction of the other surface such that a capacitive cross coupling is achieved in which an electric field predominantly acts between a plurality of resonant cavities 411 and 413 in the ceramic waveguide filter, as shown in FIG. 4 and FIG. 5.

The coupling recess 561 may be formed between the first resonant cavity 411 and the third resonant cavity 413 (FIGS. 4 and 5) on one surface of the ceramic block 500, not to overlap with the second through partition wall 422 (FIGS. 4 and 5). In addition, a metal layer 562 is formed on the inside of the coupling recess 561, as in the plurality of through partition walls 421, 422, 423, 424, 425 and 426 (FIGS. 4 and 5).

Here, the depth of the coupling recess 561 can be adjusted according to a frequency at which capacitive cross coupling is formed. Therefore, depending on the frequency at which the capacitive cross coupling is to be formed, as the depth of the coupling recess 561 increased, the thickness of the ceramic block 500 may be very thin at the position where the coupling recess 561 is formed. In this case, breakage may occur in the region where the coupling recess 561 is formed during manufacture and handling of the ceramic waveguide filter.

Figure 7:
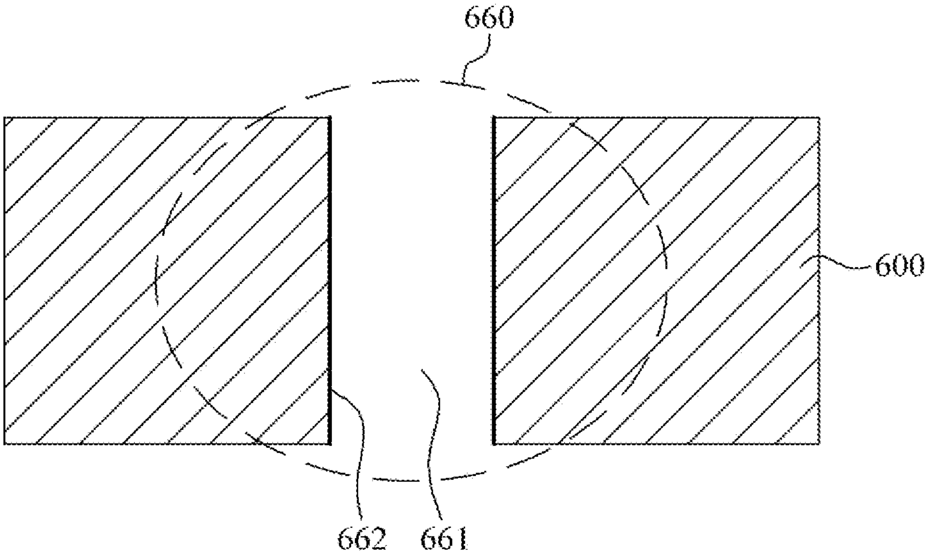

FIG. 7 shows a case where a capacitive coupling structure 660 is implemented with a coupling hole 661 penetrating one surface and the other surface of the ceramic block 600. In addition, a metal layer 662 is also formed on the inner surface of the coupling hole 661. In FIG. 7, as the capacitive coupling structure 660 is formed in the form of a hole penetrating the ceramic block 600, it is possible to prevent the ceramic block 600 from being broken by the capacitive coupling structure.

Here, the metal layer 662 may be removed from a portion of the inner surface of the coupling hole 661, to further form a slot (not shown).

Figure 8:
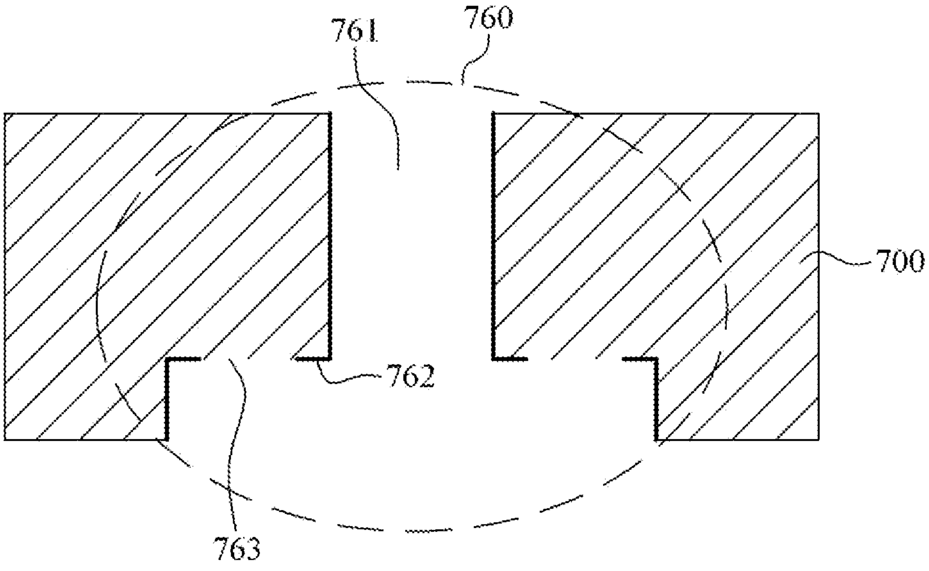

Meanwhile, in FIG. 8, a capacitive coupling structure 760 is implemented with a coupling hole 761 penetrating one surface and the other surface of the ceramic block 700 as in FIG. 8. However, the coupling hole 761 is formed in a stair-type structure, unlike the coupling hole 661 of FIG. 7. In addition, a metal layer 762 is formed on the inner surface of the coupling hole 761. In this case, in FIG. 8, the metal layer 762 may be removed from a portion of the inner surface of the coupling hole 761 in a stair-type structure, to further form a slot 763. The slot 763 may be formed on a portion of a surface parallel to one surface of the ceramic block 700, on the inner surface of the coupling hole 761.

If the slot 763 is formed, tuning on the frequency at which capacitive cross coupling is formed can be performed by adjusting the size of the slot 763 by means of a grinder or the like. This slot 763 makes tuning easier than having to adjust the thickness of the metal layers 562 (FIG. 6) and 662 (FIG. 7) or the slot (not shown) formed on the inner surface of the coupling recess 561 (FIG. 6) or of the coupling hole 661 (FIG. 7) by means of grinding or the like.

Figure 9:
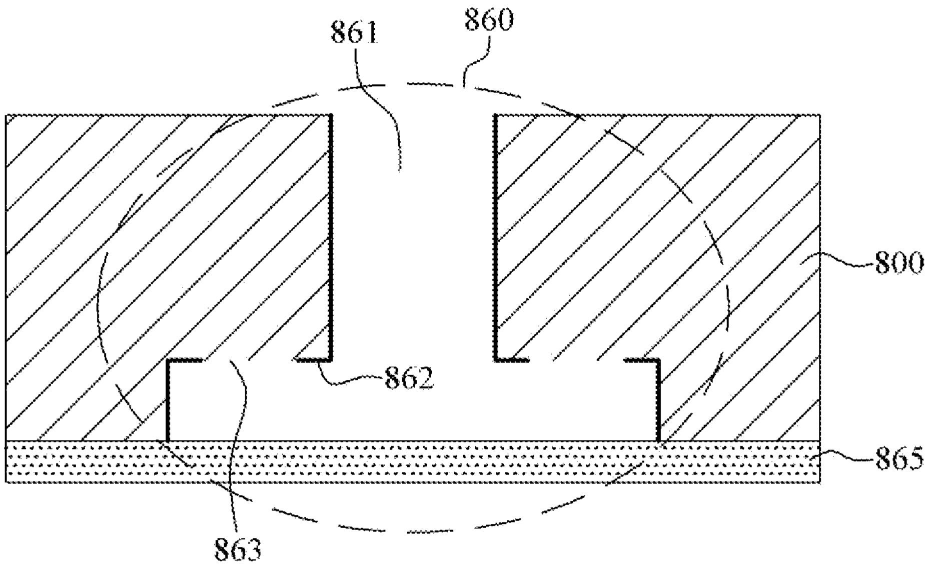

In the capacitive coupling structure 860 in FIG. 9, a coupling hole 861 in a stair-type structure, a metal layer 862 and a slot 863 may be formed, similar to in FIG. 8. In addition, a conductive sticker 865 for preventing signal leakage due to the slot 863 is further attached to one surface of the ceramic block 800. The conductive sticker 865 may be attached to the whole of one surface of the ceramic block 800, but also may be attached only to a region corresponding to the coupling hole 861.

In addition, a conductive sticker may also be attached to regions corresponding to the coupling holes 661 and 761 of FIG. 7 and FIG. 8, respectively.

The capacitive coupling structures 660, 760 and 860 of FIG. 7 to FIG. 9, respectively, are structures for preventing breakage due to the coupling recess 561 shown in FIG. 6 during manufacture and handling of the ceramic waveguide filter.

Figure 10:
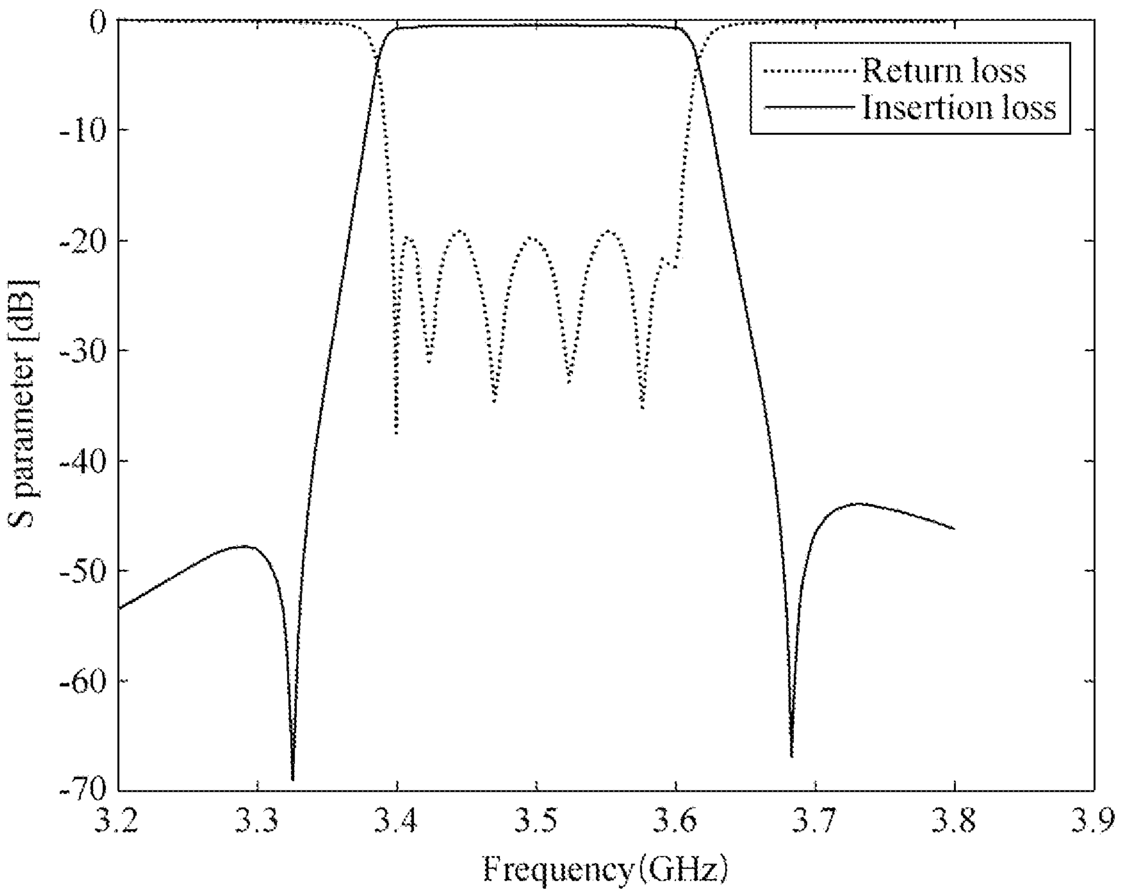
FIG. 10 shows a result of simulating the filter characteristics of the ceramic waveguide filter of FIG. 4 and FIG. 5.

FIG. 10 shows a result of simulating the filter characteristics (i.e. insertion loss, return loss) of the ceramic waveguide filter of FIG. 4 and FIG. 5.

In FIG. 10, it is assumed that a capacitive coupling structure 460 is formed between the first and the third resonant cavities 411 and 413 in the ceramic waveguide filter of FIG. 4 and FIG. 5 and the third and the fifth through partition walls 423 and 425 extend to the side boundary of the ceramic block 400 so that cross couplings are suppressed between the second resonant cavity 412 and the fourth resonant cavity 414, and between the fourth resonant cavity 414 and the sixth resonant cavity 416.

As a capacitive coupling structure 460 is formed between the first and the third resonant cavities 411 and 413, a capacitive cross coupling is formed between the first resonant cavity 411 and the third resonant cavity 413, whereas an inductive cross coupling is formed between the third resonant cavity 413 and the fifth resonant cavity 415.

As described above, an inductive cross coupling generates a transmission zero at a higher frequency than the passband, whereas a capacitive cross coupling generates a transmission zero at a frequency lower than the passband.

Accordingly, in the ceramic waveguide filter of FIG. 4 and FIG. 5, in which both inductive cross coupling and capacitive cross coupling are generated, it can be seen that, transmission zeros are generated at both ends of the passband frequency, as shown in FIG. 10. These results indicate that the ceramic waveguide filter according to this embodiment can function as a band pass filter of very good performance.

Figure 11:
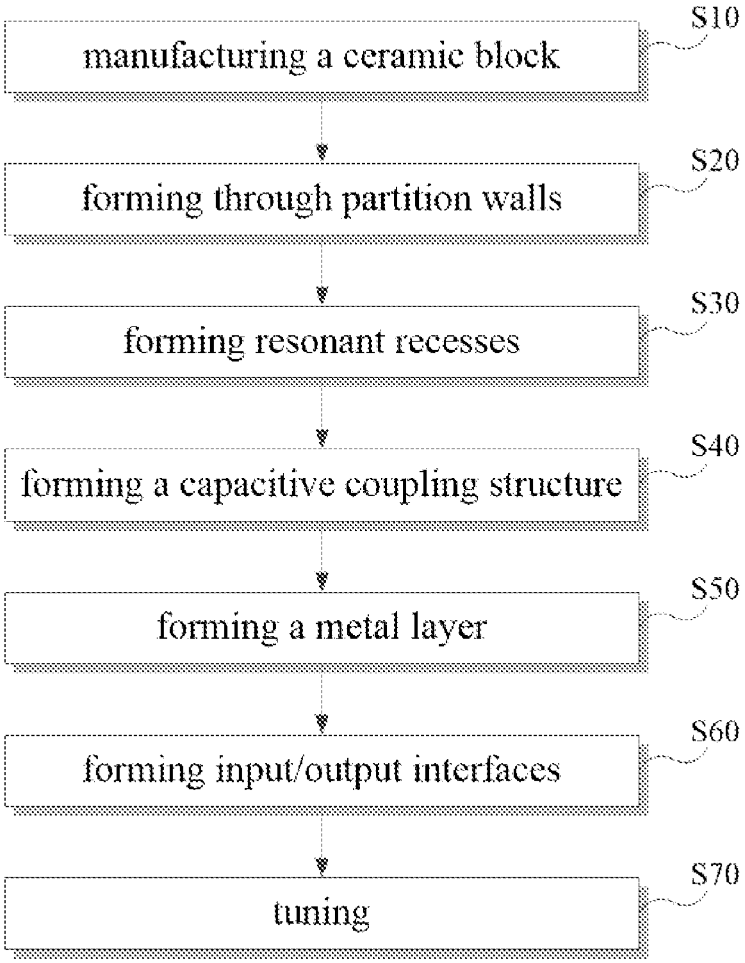
FIG. 11 shows a method of manufacturing a ceramic waveguide filter according to an embodiment of the present disclosure.

FIG. 11 shows a method of manufacturing a ceramic waveguide filter according to an embodiment of the present disclosure.

The method of manufacturing a ceramic waveguide filter of FIG. 11 is described, with reference to FIG. 2 to FIG. 10.

Prior to manufacturing the ceramic waveguide filter, filtering characteristics and a frequency band to be filtered by the ceramic waveguide filter are determined in advance.

Then, a ceramic block is manufactured according to the determined frequency band (S10). Here, the ceramic block may be manufactured to have a certain size and shape determined according to the determined frequency band.

Then, depending on the frequency band to be filtered and whether resonant recesses are formed, a plurality of through partition walls penetrating one surface and the other surface of the ceramic block are formed in a pre-designated pattern to divide the ceramic block into a plurality of sections, thereby implementing a plurality of resonant cavities (S20). Here, when forming the through partition walls, whether or not the resonant recesses are formed is considered because, if the resonant recesses are formed, a plurality of through partition walls must be formed such that the size of the resonant cavities can be implemented smaller. In addition, the plurality of through partition walls are formed to be spaced apart from each other. Since the plurality of through partition walls are formed to be spaced apart from each other, the plurality of resonant cavities can be coupled through spaced coupling windows between the plurality of through partition walls.

If a plurality of through partition walls are formed to implement a plurality of resonant cavities, resonant recesses are formed in each region of the plurality of resonant cavities (S30). Here, the resonant recesses may be formed at the center of each region of the plurality of resonant cavities. As described above, if resonant recesses are formed in the plurality of resonant cavities, the ceramic waveguide filter can be miniaturized and spurious characteristics can be improved.

When a plurality of resonant recesses are formed, if capacitive cross coupling is required according to a pre-determined filtering characteristic, that is, if a transmission zero point is to be generated at a frequency lower than the passband, a capacitive coupling structure for generating capacitive cross coupling is further formed (S40). The capacitive coupling structure may be formed so as not to overlap with a through partition wall corresponding between two resonant cavities of the plurality of resonant cavities. In addition, the capacitive coupling structure may be formed in the form of a coupling recess 561 or a coupling hole 661, 761 and 861 as respectively shown in FIG. 6 to FIG. 9. In addition, the coupling hole may be formed in a stair-type as shown in FIG. 8 and FIG. 9.

Here, the step of forming the capacitive coupling structure may be omitted if capacitive cross coupling is not required.

Meanwhile, on the surface of each of the plurality of through partition walls and the inner surface of the resonant recess, a metal layer is formed by applying a metallization process such as plating, deposition, sputtering or the like with a conductive material such as silver (S50). At this time, the metal layer is formed not only on the surface of each of the plurality of through partition walls and the resonant recesses, but also on the inner surface of the capacitive coupling structure. In addition, it may also be formed on the outer surface of the ceramic block. If the capacitive coupling structure is formed as a coupling hole 761 and 861 in a stair-type as respectively shown in FIG. 7 and FIG. 8, a metal layer may not be formed on some surfaces of the coupling hole such that slots 763 and 863 can be formed as respectively shown in FIGS. 7 and 8. Alternatively, the metal layer may be formed irrespective of the slots 763 and 863, and may be adjusted by means of grinding or the like together with the metal layer formed on the through partition wall in the tuning step (S70) to be described later.

In addition, input/output interfaces are formed in two resonant cavities of the plurality of resonant cavities (S60). Here, the input/output interfaces may be formed in resonant cavities at both ends in the sequence in which the plurality of resonant cavities are coupled such that the plurality of resonant cavities of the ceramic waveguide filter can receive a signal from an input interface port, be sequentially coupled, and then output the filtered signal to an output interface port. Here, the input/output interfaces may be formed in the form of a through hole penetrating one surface and the other surface of the ceramic block such that the ceramic waveguide filter can have a broadband characteristic and be insensitive to mechanical tolerances.

Then, the characteristics of the ceramic waveguide filter are tuned (S70), by finely adjusting the coupling value between the plurality of resonant cavities by adjusting the thickness of the metal layers formed on the surface of each of the plurality of through partition walls and on the inner surface of the resonant recesses by means of grinding or the like.

In this case, as respectively shown in FIGS. 7 and 8, if the capacitive coupling structure is formed, the thickness of the inner surface of the capacitive coupling structure can be adjusted together. In addition, the frequency at which capacitive cross coupling is formed can be tuned together by grinding the metal layer formed on the inner surface of the coupling holes 761 and 861 to form slots 763 and 863, or by adjusting the size of the formed slots 763 and 863.

In the method of manufacturing a ceramic waveguide filter of FIG. 11, the sequence of the steps of forming resonant recesses (S30), forming a capacitive coupling structure (S40), forming a metal layer (S50), and forming input/output interfaces (S60) can be adjusted to improve process efficiency.

While the present disclosure is described with reference to embodiments illustrated in the drawings, these are provided as examples only and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A ceramic waveguide filter, comprising:

a plurality of resonant cavities defined by a plurality of through partition walls formed in a single ceramic block to divide sections of the ceramic block according to a pre-designated pattern;

a plurality of resonant recesses formed in the sections of the plurality of resonant cavities divided by the plurality of through partition walls;

a respective metal layer formed on a surface of each of the plurality of through partition walls; and input/output interfaces formed in two of the plurality of resonant cavities for inputting and outputting signals among the plurality of resonant cavities, a capacitive coupling structure on one surface of the ceramic block, spaced apart from the plurality of through partition walls and disposed between the plurality of resonant cavities, and a metal layer formed on an inside of the capacitive coupling structure, wherein the plurality of through partition walls pass through the ceramic block and divides the sections of the ceramic block such that the plurality of resonant cavities having the plurality of resonant recesses are defined, wherein the plurality of resonant cavities are spaced apart from each other to filter a pre-designated frequency band while being sequentially coupled with adjacent resonant cavities through coupling windows formed by the plurality of through partition walls in response to the signal input through the input/output interfaces, and wherein at least one resonant cavity from among the plurality of resonant cavities is disposed adjacent another one resonant cavity from among the plurality of resonant cavities, thereby allowing cross coupling to occur.

2. The ceramic waveguide filter according to claim 1, wherein the plurality of resonant recesses are formed in each of centers of corresponding resonant cavity regions among the plurality of resonant cavities.

3. The ceramic waveguide filter according to claim 2, wherein the input/output interfaces are formed in a form of through holes passing through the ceramic block.

4. The ceramic waveguide filter according to claim 1, wherein the metal layer disposed respectively on the surface of each of the plurality of through partition walls has a thickness that is adjusted depending on the pre-designated frequency band.

5. The ceramic waveguide filter according to claim 1, wherein the capacitive coupling structure comprises a coupling recess and a depth of the coupling recess is adjusted according to a frequency at which capacitive cross coupling is formed.

6. The ceramic waveguide filter according to claim 1, wherein the capacitive coupling structure comprises a coupling hole, and the coupling hole spaced apart from the plurality of through partition walls between the plurality of resonant cavities in which the cross coupling occurs, the coupling hole passing through the ceramic block; and wherein a metal layer is formed inside of the coupling hole.

7. The ceramic waveguide filter according to claim 6, wherein the coupling hole has an inner side formed in a stair-type structure, and wherein the metal layer is formed in an area other than a pre-designated slot area facing one surface of the ceramic block on the inside of the coupling hole of the stair-type structure.

8. The ceramic waveguide filter according to claim 6, wherein the ceramic waveguide filter further comprises a conductive sticker attached to a region in which the coupling hole is formed on one surface of the ceramic block.

9. A method of manufacturing a ceramic waveguide filter, comprising:

in order to define a plurality of resonant cavities in a ceramic block, forming a plurality of through partition walls dividing sections of the ceramic block according to a pre-designated pattern;

forming a plurality of resonant recesses in the sections of the plurality of resonant cavities divided by the through partition walls;

forming a respective metal layer on a surface of each of the plurality of through partition walls;

forming input/output interfaces for inputting and outputting signals in two of the plurality of resonant cavities among the plurality of resonant cavities;

forming a capacitive coupling structure on one surface of the ceramic block and spaced apart from the plurality of through partition walls between resonant cavities; and forming the metal layer on an inside of the capacitive coupling structure, wherein the plurality of through partition walls pass through the ceramic block and divides the sections of the ceramic block such that the plurality of resonant cavities having the plurality of resonant recesses are defined, wherein the plurality of resonant cavities are spaced apart from each other to filter a pre-designated frequency band while being sequentially coupled with adjacent resonant cavities through coupling windows formed by the plurality of through partition walls in response to the signal input through the input/output interfaces, and wherein at least one resonant cavity from among the plurality of resonant cavities is disposed adjacent another one resonant cavity from among the plurality of resonant cavities, thereby allowing cross coupling to occur.

10. The method according to claim 9, wherein the method of manufacturing a ceramic waveguide filter further comprises:

adjusting a thickness of the metal layer disposed on the surface of each of the plurality of through partition walls depending on the pre-designated frequency band.

11. The method according to claim 9, wherein in the step of forming the plurality of resonant recesses, the plurality of resonant recesses are formed in each of centers of corresponding resonant cavity regions among the plurality of resonant cavities.

12. The method according to claim 11, wherein in the step of forming the input/output interfaces, the input/output interfaces are formed in a form of through holes passing through the ceramic block.

13. The method according to claim 9, wherein the capacitive coupling structure comprises a coupling recess and a depth of the coupling recess is adjusted according to a frequency at which capacitive cross coupling is formed.

14. The method according to claim 9, wherein the capacitive coupling structure comprises a coupling hole; and the method of manufacturing a ceramic waveguide filter further comprises:

forming a coupling hole spaced apart from the plurality of through partition walls between resonant cavities in which the cross coupling occurs, the coupling hole passing through the ceramic block; and forming the metal layer on an inner surface of the coupling hole.

15. The method according to claim 14, wherein in the step of forming the coupling hole an inside of the coupling hole is formed in a stair-type structure, and wherein in the step of forming the metal layer on the inner surface of the coupling hole the metal layer is formed in an area other than a pre-designated slot area facing one surface of the ceramic block on the inside of the coupling hole of the stair-type structure.

16. The method according to claim 15, wherein the method of manufacturing a ceramic waveguide filter further comprises:

attaching a conductive sticker to a region in which the coupling hole is formed on one surface of the ceramic block.

* * * * *